(12) United States Patent
Gardner et al.

(10) Patent No.: US 11,867,577 B2
(45) Date of Patent: *Jan. 9, 2024

(54) WELDED DIFFERENTIAL PRESSURE TRANSDUCER ASSEMBLY

(71) Applicant: KULITE SEMICONDUCTOR PRODUCTS, INC., Leonia, NJ (US)

(72) Inventors: Robert Gardner, Westwood, NJ (US); Louis DeRosa, Saddle River, NJ (US)

(73) Assignee: Kulite Semiconductor Products, Inc., Leonia, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/489,980

(22) Filed: Sep. 30, 2021

(65) Prior Publication Data

US 2022/0107213 A1 Apr. 7, 2022

Related U.S. Application Data

(60) Provisional application No. 63/087,482, filed on Oct. 5, 2020.

(51) Int. Cl.
*G01L 19/14* (2006.01)
*G01L 13/00* (2006.01)

(52) U.S. Cl.
CPC ............ *G01L 19/147* (2013.01); *G01L 13/00* (2013.01); *G01L 19/142* (2013.01)

(58) Field of Classification Search
CPC .................. G01L 13/00–06; G01L 19/14–149
See application file for complete search history.

(56) References Cited

U.S. PATENT DOCUMENTS

| 7,673,518 | B2* | 3/2010 | Kurtz ..................... G01L 13/025 |
| | | | 257/414 |
| 8,707,791 | B2* | 4/2014 | Gardner .............. G01L 19/0007 |
| | | | 73/702 |
| 9,778,130 | B2* | 10/2017 | DeRosa .............. G01L 19/0038 |
| 10,330,553 | B2* | 6/2019 | Gardner .............. G01L 19/0636 |

* cited by examiner

*Primary Examiner* — Justin N Olamit
(74) *Attorney, Agent, or Firm* — Troutman Pepper Hamilton Sanders LLP; James E. Schutz; Mark Lehi Jones (57) ABSTRACT

A differential pressure transducer assembly having internal sub-components welded together to improve reliability and ease assembly. A method is provided that includes welding a front adapter to a frontside of a header and welding a back adapter to a backside of the header to create a first sub-assembly. The method includes welding the first sub-assembly to a front attachment port to create a second sub-assembly. The method further includes welding a cap to a backside of the back adapter.

6 Claims, 6 Drawing Sheets

WELDED DIFFERENTIAL PRESSURE TRANSDUCER ASSEMBLY

CROSS-REFERENCE TO RELATED APPLICATIONS

This application claims the benefit of U.S. Provisional Patent Application No. 63/087,482, filed 5 Oct. 2020, which is incorporated by reference herein in its entirety.

TECHNICAL FIELD

The disclosed technology relates to a differential pressure transducer assembly having internal connections welded to improve reliability and ease assembly.

BACKGROUND

Pressure transducer assemblies typically include one or more sensor elements mounted on a header, with the header attached to a housing. In a differential pressure transducer, a main inlet port directs pressures from the measurement environment through the housing to a front side of the sensor element, and a reference inlet port is utilized to direct a reference pressure to the backside of the sensor element so that a difference in the applied pressures can be measured.

The process of assembling a differential pressure transducer can be difficult because two separate pressure channels (with associated connectors) are needed: one for the main pressure, and one for the reference pressure. The routing of the reference pressure is commonly accomplished by employing a narrow-diameter stainless steel tube that is bent (often requiring a small bend radius) and connected on at least one end with a nut and a crush ring assembly. This "reference tube" and the associated connections are difficult to install and are prone to leaking.

Figure 1:
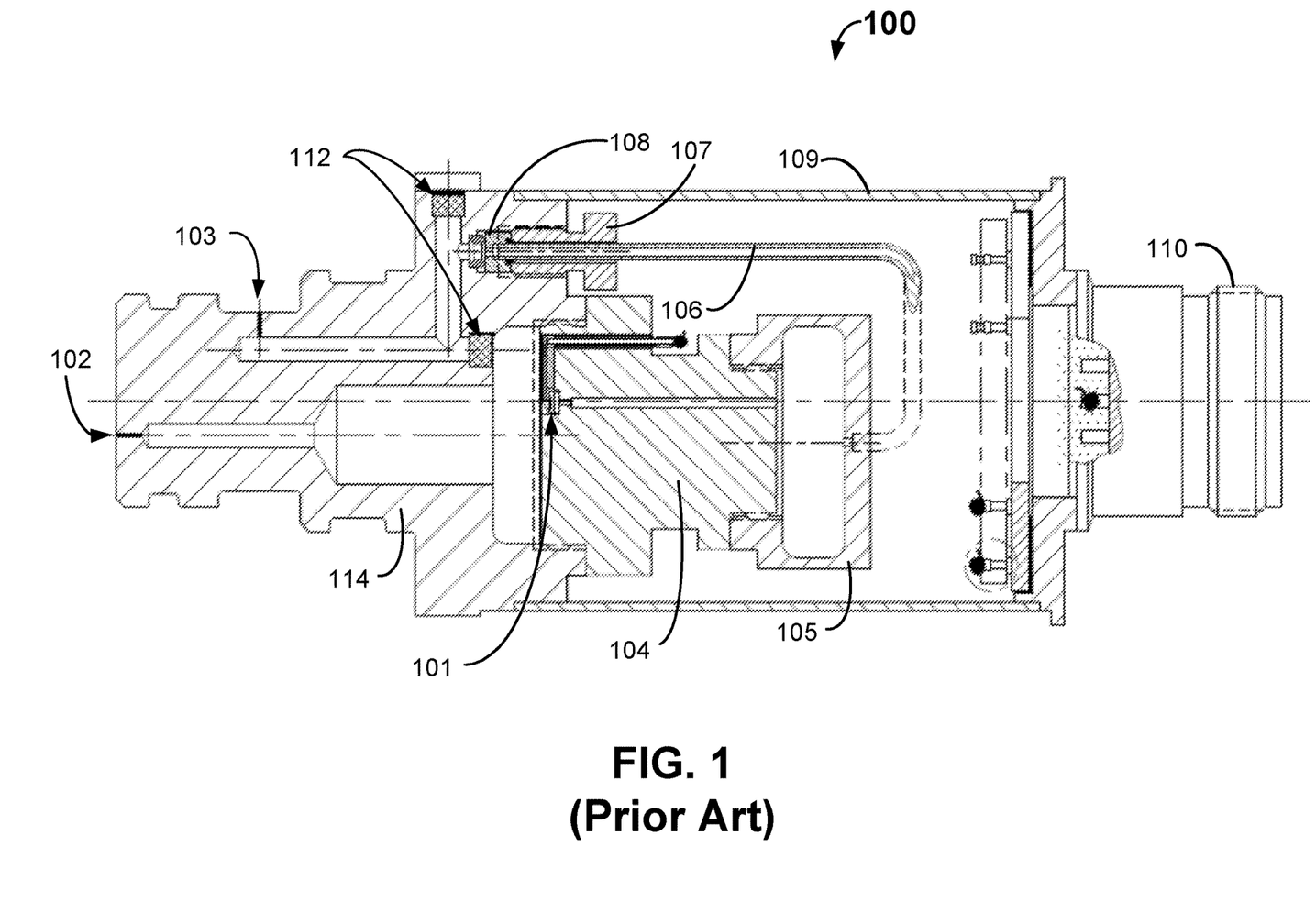
FIG. 1 depicts a conventional differential pressure transducer assembly 100.

FIG. 1 depicts a conventional differential pressure transducer assembly 100 in which main and reference pressures are routed to a pressure sensing chip 101 via a first (main) opening 102 and a second (reference) opening 103. In such a conventional assembly 100, the pressure sensing chip 101 is mounted to a header 104, with main pressure routed to a front side of the chip 101. The reference pressure is routed to the backside of the chip 101 via a reference tube 106, an optional cap 105, and through a channel or bore extending through the backside of the header 104. In this assembly 100, the front side of the header 104 is typically welded directly to the front port 114. The cap 105 can be sealed to one end of the reference tube 106 and the cap 105 can be welded to the header. The reference tube 106 is bent around and connected to the front port using a nut 107 and a crush ring 108. A passageway through the front port 114 connects the reference tube 106 to the reference opening 103. A sleeve 109 and back end 110 can be welded to the front port 114, enclosing the internal components and completing the assembly. Plugs 112 may be installed to terminate the various drill holes that are made to define the internal channels in the front port 114.

With sufficient skill, care, and precise dimensional tolerances, this assembly 100 can properly operate, but it can be time-consuming to bend the reference tube 106 for proper alignment and coupling to the associated components at each end, and the nut 107 and crush ring 108 assembly is prone to leaking. Also, the long, small-diameter reference tube 106 can limit the frequency response of the reference pressure measurement. A need exists for an improved transducer assembly configuration.

BRIEF SUMMARY

The disclosed technology includes a differential pressure transducer assembly having subcomponents that can be assembled and welded. The resulting compact configuration can provide certain reliability and assembly advantages over conventional designs. In some implementations, the improved configuration disclosed herein may enable internal routing of reference pressure without requiring the typical reference tube, nut, and crush ring, and their associated drawbacks. The improved configuration disclosed herein may further enable selectively configuring port diameters, for example, to tune the frequency response of the transducer.

According to an example implementation of the disclosed technology, a differential pressure transducer assembly is provided. The differential pressure transducer assembly includes a header; a front adapter attached to a front portion of the header, the front adapter comprising a main channel configured for communication with a first side of a sensing element; a back adapter attached to a back portion of the header, the back adapter comprising a reference channel configured for communication with a second side of the sensing element; a front attachment port comprising a reference channel and a bore extending therethrough and configured for mating the front adapter; and a cap attached to a back portion of the back adapter, the cap at least partially defining a reference channel in communication with the reference channel of the front attachment port. The front adapter is welded to the front portion of the header; the back adapter is welded to the back portion of the header; a front portion of the front adapter is welded to a front portion of the front attachment port, and the cap is welded to the back portion of the back adapter.

A method is disclosed for assembling a differential transducer assembly using welds. The method includes welding a front adapter to a frontside of a header and welding a back adapter to a backside of the header to create a first sub-assembly; welding the first sub-assembly to a front attachment port to create a second sub-assembly; and welding a cap to a backside of the back adapter.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Although many embodiments of the disclosed technology are explained in detail, it is to be understood that other embodiments are contemplated. Accordingly, it is not intended for the disclosed technology to be limited in scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity.

Referring now to the figures, certain example implementations of the disclosed technology are described herein. It is to be understood that the figures and descriptions have been simplified to illustrate elements that are relevant for a clear understanding, while eliminating, for purposes of clarity, many other elements found in typical pressure sensor assemblies and methods of making and using the same. Those of ordinary skill in the art will recognize that other elements may be desirable and/or required for implementation. However, because such elements are well known in the art, and because they do not facilitate a better understanding of the disclosed technology, a discussion of such elements is not provided herein.

According to certain example implementations, a transducer assembly is disclosed for measuring one or more parameters or properties associated with an input condition stream. The term "condition stream" as used herein may refer to a measurement medium, such as a liquid or a gas. The transducer assembly may be configured to measure pressure and/or temperature associated with the condition stream. For example, in one illustrative implementation, the transducer assembly may be configured to measure the dynamic and/or static oil pressure within a machine. The transducer assembly disclosed herein may be utilized to measure a differential pressure between a first input condition stream entering a first inlet port and a second input condition stream entering a second inlet port. The terms "main" and "reference" used herein may refer respectively to the first and second input condition stream. However, in some implementations, such designations may be arbitrary.

Figure 2:
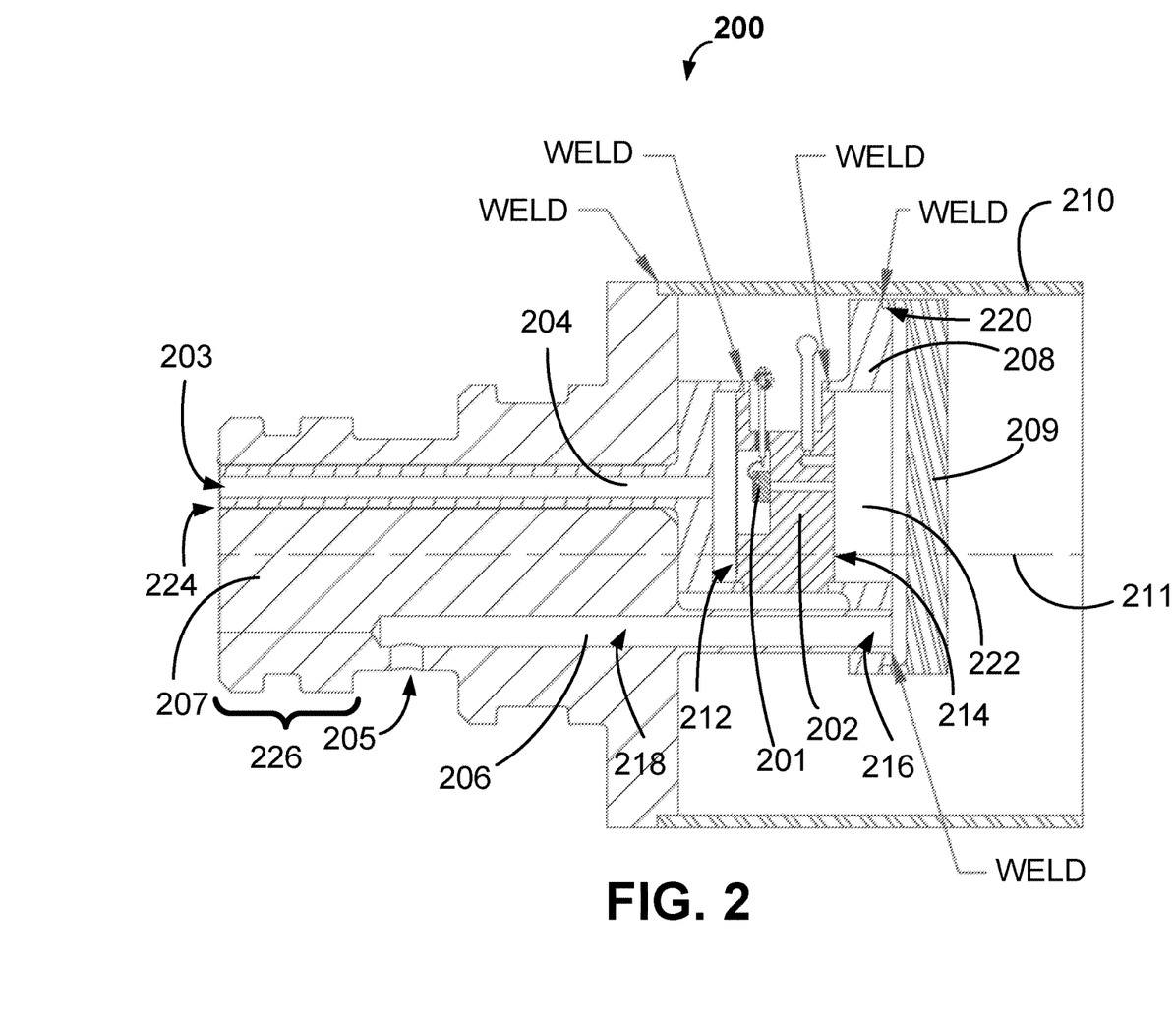
FIG. 2 illustrates a differential pressure transducer assembly 200 with subcomponent configurations that can be welded to improve ease of assembly and reliability, in accordance with certain implementations of the disclosed technology.

To overcome some of the drawbacks associated with conventional differential pressure transducers (such as the conventional differential pressure transducer 100 discussed above with reference to FIG. 1), an improved differential pressure transducer assembly 200 is provided and illustrated in FIG. 2, in accordance with certain exemplary implementations of the disclosed technology.

According to certain implementations of the disclosed technology, the differential transducer assembly 200 depicted in FIG. 2 can include a pressure sensing element 201 mounted to a front side of a header 202 such that a first (main) pressure may be routed to the front side of the sensing element 201 through a main port opening 203 and its associated main channel(s) 204. In certain implementations, the main channel 204 may be defined by a tube that extends from the header 202, through the front attachment port 207, and to the main port opening 203. In an exemplary implementation, a second (reference) pressure may be routed to the backside of the sensing element 201 via a reference port opening 205 and its associated reference channel(s) 206.

In accordance with certain exemplary implementations of the disclosed technology, the reference channel 206 may include a tube that extends from the front attachment port 207 and slides through a hole in the back adaptor 208 where it can be welded to make a connection to the reference port opening 205. In certain implementations, a cap 209 may be welded onto the rear side of the back adaptor 208, sealing the connection between the reference port opening 205 and the backside of the header 202.

In an example implementation, at least a portion of the reference channel 206 may be defined in or by the front attachment port 207, which may eliminate a need to use a separate reference tube, nut, and/or crush ring (such as the reference tube 106, nut 107, and crush ring 108, as discussed above with reference to FIG. 1).

According to certain exemplary implementations, electronics and/or associated conductors, connectors, etc. (not shown) of the differential transducer assembly 200 can be added as appropriate and a sleeve 210 may be welded to the front attachment port. As will further be discussed below with reference to FIGS. 3A-3D, the various channels and sub-assemblies may be secured and sealed using welds.

Certain implementations of the differential pressure transducer assembly 200 disclosed herein may improve part alignment and/or enable automatic alignment of the associated components during assembly.

Certain configurations of the differential pressure transducer assembly 200 (illustrated in FIG. 2) may further solve certain reliability issues that can be associated with conventional differential transducers, for example, as discussed above with reference FIG. 1, via the elimination of the narrow diameter reference tube 105, nut 106, and crush ring 107, which can be prone to leaking. Implementations of the disclosed technology may enable the use of a simplified reference channel 206 in place of the above-mentioned parts, to route pressure media from the reference port opening 205 to the backside of the sensor element 201, and to improve sealing reliability. Certain implementations may utilize welds to join and/or seal certain sub-components having channels defined therein as will be discussed below with reference to FIGS. 3A-3D.

As discussed herein, the term "axis" is intended to refer to a reference line (such as line 211) in a Cartesian coordinate system that is co-located with an axis of the transducer assembly. Unless described otherwise herein, the axis of the transducer assembly is defined as the rotationally invariant axial dimension of the transducer assembly main pressure inlet port defined at least by a substantially cylindrical portion of the main inlet port and/or interfacing nipple of the transducer assembly. For embodiments having main inlet ports that are characterized other than cylindrical, (rectangular or square, for example) the axis may be defined as being substantially perpendicular to a joining surface between the transducer assembly and an external equipment interface port to which the transducer assembly is configured for coupling.

Figure 3A:
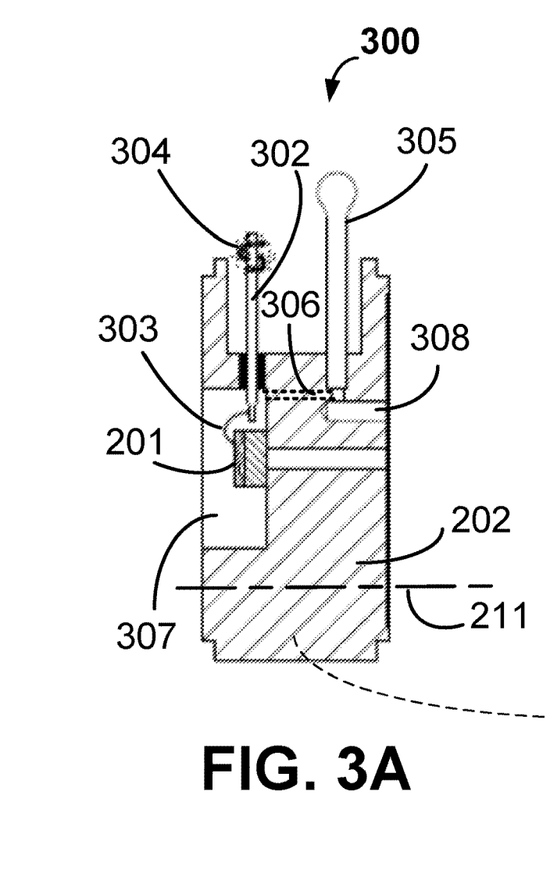
FIG. 3A illustrates a header portion 300 of the example differential pressure transducer assembly 200, as depicted in FIG. 2, in accordance with certain implementations of the disclosed technology.

FIG. 3A illustrates an exemplary implementation of a header sub-assembly 300 that can include a sensing element 201 mounted on the header 202. Certain implementations of the header 202 and associated parts depicted in FIG. 2 may correspond to the header sub-assembly 300 as shown in FIG. 3A.

In certain exemplary implementations, two or more header pins 302 may be installed in the header sub-assembly 300, electrically isolated from the header 202, and connected to the sensing element 201 with a conductor 303, for example, to supply power to the sensing element 201 and/or to output signals from the sensing element 201. On an external portion of the header pin 302, another conductor 304 may be electrically connected to the header pin 302 for routing to external electronics, for example. In certain implementations, when assembled with the other sub-components (as will be discussed below with reference to FIGS. 3B-3D), at least one of the header pins 302 may be configured substantially perpendicular to the axis 211 and may extend through the top or side of the header 202 (rather than through a back portion of a header as shown in FIG. 1). In accordance with certain exemplary embodiments, the perpendicular orientation of the header pins 302 with respect to the axis 211 (also shown in FIG. 3B) may provide for a more compact transducer package without requiring electrical connections to be routed out of the backside of the header 202 and may enable additional improvements that can simplify the assembly of the transducer. Certain implementations may utilize other header and header pin configurations as disclosed in U.S. Pat. No. 8,191,424, which is incorporated herein by reference.

In accordance with certain exemplary implementations of the disclosed technology, the header sub-assembly 300 can include a bulb 305 configured to be filled with oil, for example, via an oil port 308. In certain exemplary implementations, the oil may pass through an oil channel 306 to fill an oil cavity 307 surrounding the sensor element 201. In certain exemplary implementations, the bulb 305 may be oriented vertically (i.e., perpendicular to an axis 211).

Figure 3B:
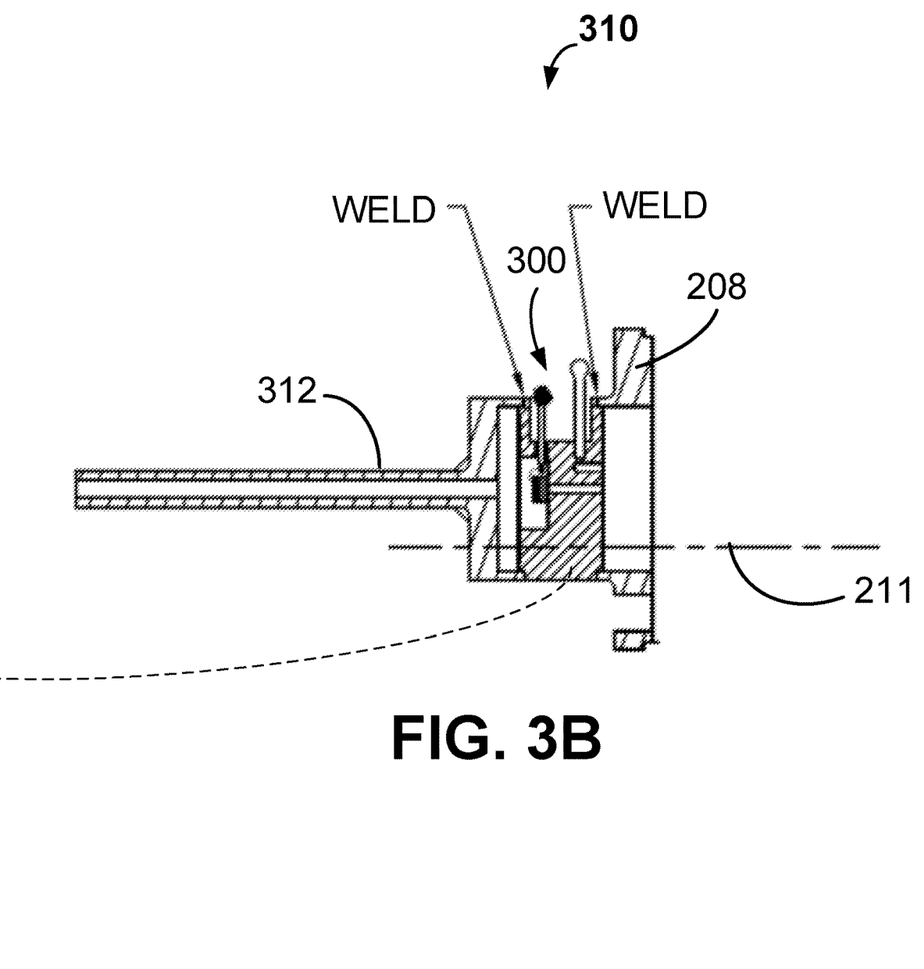
FIG. 3B illustrates a first sub-assembly 310 comprising the header portion 300 as illustrated in FIG. 3A, in accordance with certain implementations of the disclosed technology.

FIG. 3B illustrates an exemplary implementation of a combined header/adapter sub-assembly 310 that includes the header sub-assembly 300 (as discussed above with reference to FIG. 3A) mated and welded to a front adapter 312 and the back adapter 208.

Figure 3C:
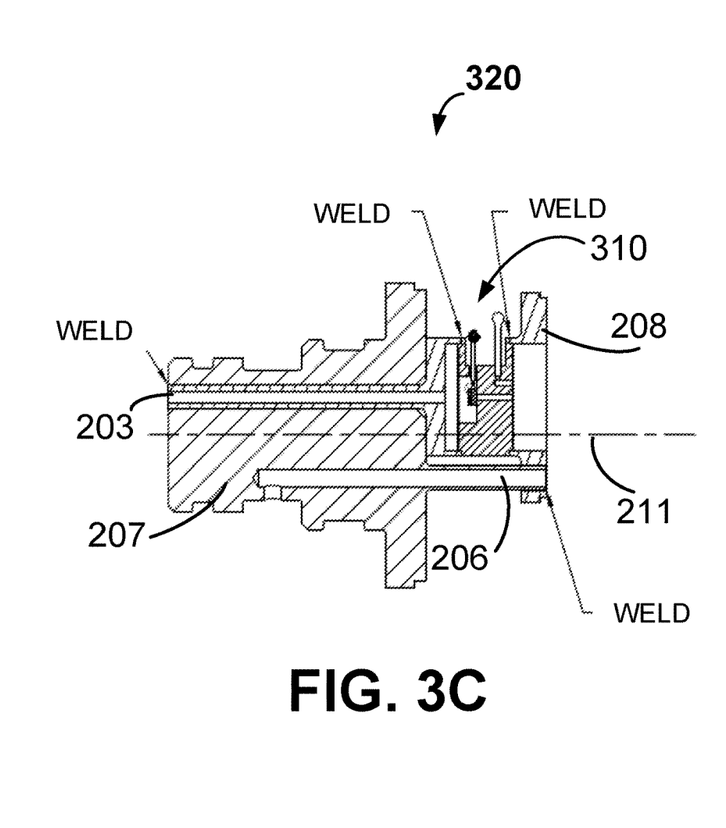
FIG. 3C illustrates a second sub-assembly 320 comprising the first sub-assembly 310 as illustrated in FIG. 3B, and a front attachment port 207, in accordance with certain implementations of the disclosed technology.

FIG. 3C illustrates an exemplary implementation of a combined front port/header/adapter sub-assembly 320 that includes the header/adapter sub-assembly 310 (as discussed above with reference to FIG. 3B). To prepare this sub-assembly 320, the long tube of the front adapter 312 portions of the combined header/adapter sub-assembly 310 may be inserted into a corresponding bore through the front attachment port 207 so that the end of the long tube of the front adapter 312 portion tube is disposed at the front of the attachment port 207 and can be welded to the front attachment port 207 near the main port opening 203. The back adapter 208 may be welded to a backside of the front attachment port 207 near the backside of the reference channel 206.

Figure 3D:
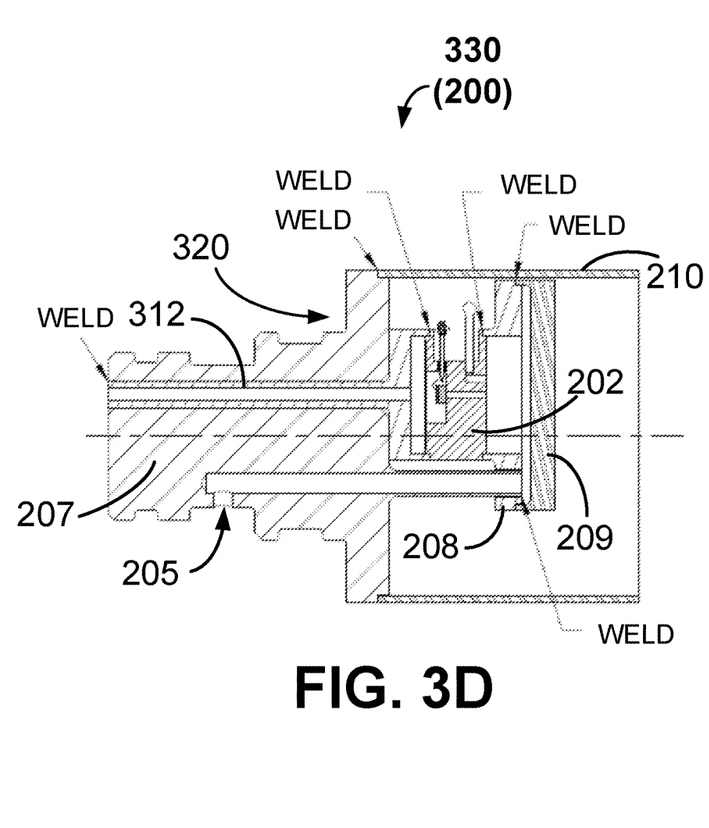
FIG. 3D illustrates a welded differential pressure transducer assembly 330 (which also corresponds to the differential pressure transducer assembly 200, as depicted in FIG. 2) comprising the second sub-assembly 320 as illustrated in FIG. 3C, with a cap and sleeve installed and welded, in accordance with certain implementations of the disclosed technology.

FIG. 3D illustrates an exemplary implementation of a combined differential pressure transducer assembly 330 (that is the same or similar to the differential pressure transducer assembly 200 discussed with reference to FIG. 2), which includes the front port/header/adapter sub-assembly 320 (as discussed above with reference to FIG. 3C). To prepare this assembly 330, the cap 209 may be welded onto the back of the back adaptor 208, sealing the channel between the reference port opening 205 and the back of the header 202. After the above-referenced welds are made, any additional components of the transducer 330 (such as electronics and connectors, not shown) can be added as appropriate, and a sleeve 210 may be welded to the front attachment port 207.

Referring again to FIG. 2 (and/or FIG. 3D) a benefit of the disclosed technology is that the front attachment port 207 may define both the main channel 204 and the reference channel 206, allowing one physical port or nipple connection for both the main and reference pressures.

Another benefit of the disclosed technology is that the frequency response of the transducer may be tuned so that the main and/or reference port may be tuned to a particular application. As discussed in U.S. Pat. No. 9,291,517, which is incorporated herein by reference as if presented in full, the tubes, channels, and or inlets can be configured with selective diameters, and the cavities created by the adaptors can be adjusted. In certain exemplary implementations, rather than machining the main inlet port 203, the reference port opening 205, and/or the associated main channel 204 and the reference channel 206 into the front adaptor 207, certain implementations may utilize pre-made tubes from a selection of tubes having a range of inner diameter that can be welded into the port or adaptor to set the desired frequency response. This allows for easier control over the size of the internal tubing for different applications without having to machine each component.

Figure 4:
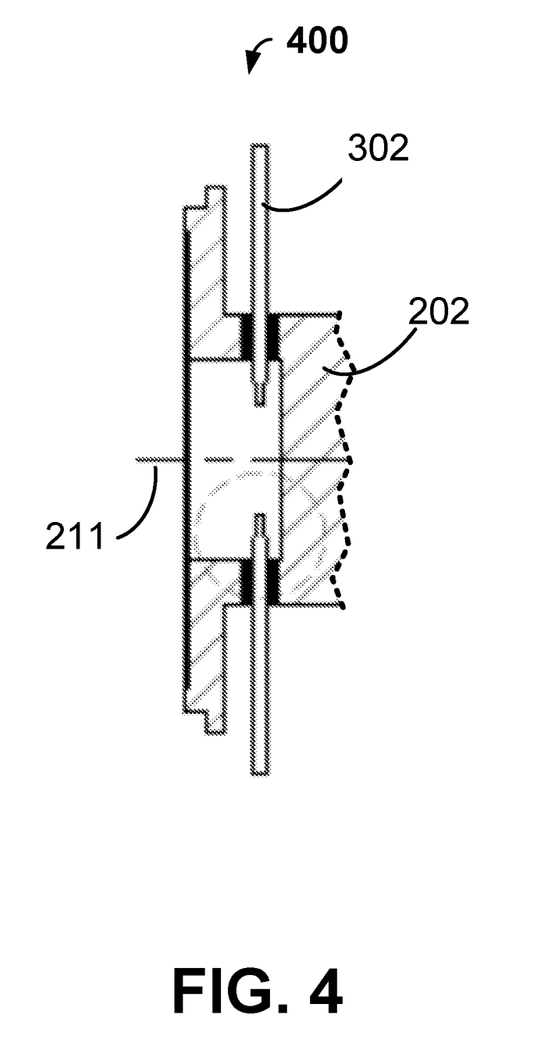
FIG. 4 illustrates a header portion 400 of an example pressure transducer assembly having header pins that extend through a portion of the header and are disposed substantially perpendicular to an axis of the transducer assembly.

FIG. 4 illustrates an exemplary implementation of a portion of a header 400 having header pins 302 that extends substantially perpendicular to an axis (such as axis 211 as discussed above) and through sides of the header 202 (rather than through a back portion of a header), according to the disclosed technology. The header pins 302 may be electrically connected to a sensing element to supply power to the sensing element and/or to route the resulting pressure signal from the sensing element to external equipment. In accordance with certain exemplary embodiments, the perpendicular orientation of the header pins 302 may provide for a more compact transducer package without requiring electrical connections to be routed out of the backside and may enable additional improvements that can simplify the assembly of the transducer. Certain implementations of the header 202 and/or pins 302 as shown in FIG. 2 and FIGS. 3A-3D may correspond to the header 202 and/or pins 302 as shown in FIG. 4.

Figure 5:
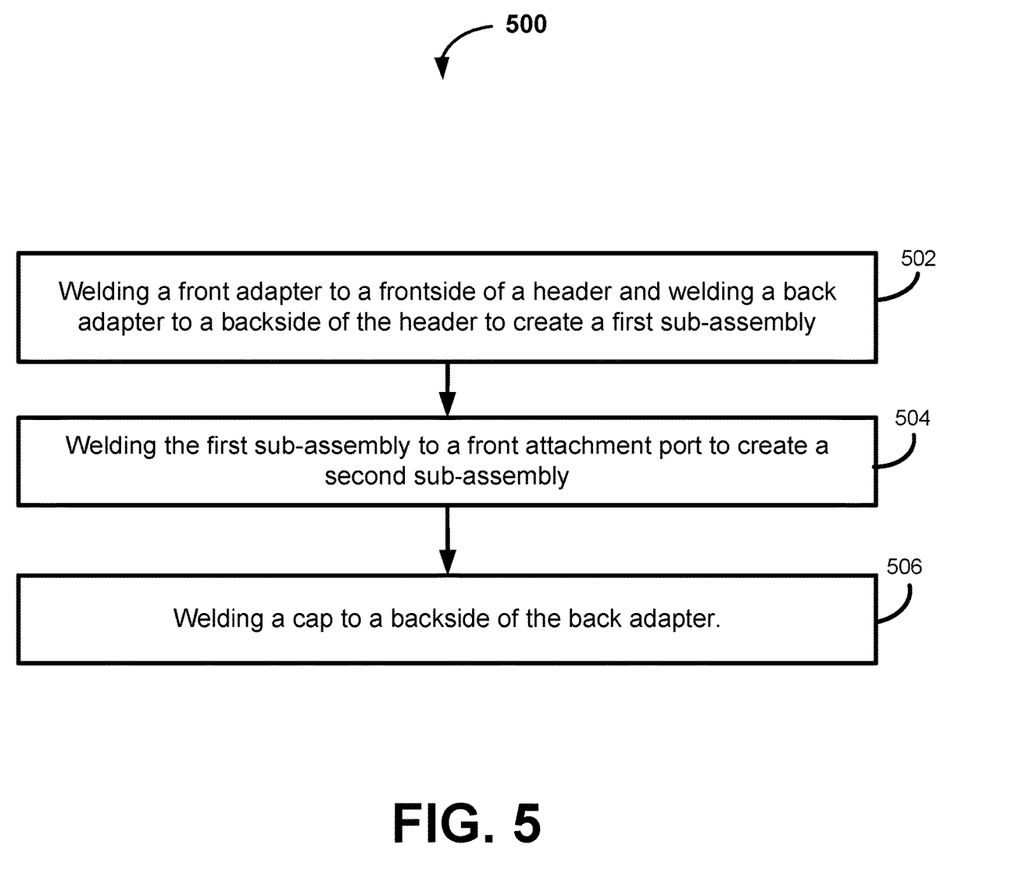
FIG. 5 illustrates a method 500 of assembling a differential pressure transducer assembly, in accordance with certain implementations of the disclosed technology.

FIG. 5 is a flow diagram of a method 500 for assembling a differential transducer assembly using welds. In block 502, the method 500 includes welding a front adapter to a frontside of a header and welding a back adapter to a backside of the header to create a first sub-assembly. In block 504, the method 500 includes welding the first sub-assembly to a front attachment port to create a second sub-assembly. In block 506, the method 500 includes welding a cap to a backside of the back adapter.

Certain implementations may include mating and attaching a sleeve to a first mating portion of the front attachment port.

Certain implementation may include mounting a sensing element to the header.

In certain exemplary implementations, a main port opening, and a main channel may be defined in the front adapter. In certain exemplary implementations, the main channel is configured to communicate a pressure from the main port opening to a frontside of the sensing element.

According to an exemplary implementation of the disclosed technology, the reference cavity is at least partially defined by the back adapter.

In certain exemplary implementations, the method can include inserting a protruding portion of the front adapter of the first sub-assembly into a corresponding bore extending through the front attachment port. Certain exemplary implementations can include welding the first sub-assembly to the front attachment port, which can include welding a region adjacent to a main port opening of the front adapter to a front portion of the front attachment port.

In certain exemplary implementations, the front attachment port comprises a reference port opening and a reference channel in communication with a backside of the sensing element.

Certain implementation can include welding the cap to the backside of the back adapter to at least partially define the reference channel.

Certain exemplary implementations of the disclosed technology can include mating and attaching a sleeve to a first mating portion of the front attachment port. Certain implementations can include welding the sleeve to the first mating portion of the front attachment port.

Certain implementation can include installing two or more header pins in the header so that the two or more header pins extend through one or more sidewalls of the header and are configured for electrical communication with a sensing element while being electrically insulated from the header. In certain exemplary implementations, the two or more header pins may be disposed perpendicular to an axis of the differential transducer assembly.

Some implementations can include installing two or more header pins in the header so that the two or more header pins extend through one or more sidewalls of the header and are configured for electrical communication with a sensing element. In certain exemplary implementations, the two or more header pins may be disposed perpendicular to an axis of the differential transducer assembly.

Those skilled in the art will appreciate that the system of equations describing the flow of pressure P through a pipe may be reduced to a wave equation in one dimension:

$$\frac{1}{c^2}\left(\frac{\partial^2 P'}{\partial t^2} + K\frac{32\mu}{\rho D^2}\frac{\partial P'}{\partial t}\right) = \frac{\partial^2 P'}{\partial x^2},$$

where c is the velocity of sound in the unconfined fluid (measurement media) and K is the fluid bulk modulus. The damping coefficient, $$K\frac{32\mu}{\rho D^2},$$

is dependent on both the pipe diameter D and viscosity (μ) of the media. With appropriate boundary conditions, the wave equation may be solved using Laplace transforms such that the frequency response of the pipe structure may be analytically estimated.

As the equation above illustrates, when the pressure flow is in an inlet channel having a large aspect ratio (for example, a smaller diameter D and long length L) the damping is increased. As the flow reaches the cavity (for example, a main pressure cavity associate with the main pressure port, or reference pressure cavity 211 shown in FIG. 2) of a set volume, the flow may be damped as the media expands to fill the cavity. By manipulating the diameter D and length L of the inlet passage and the volume of the cavity, the damping ratio, and cut-off frequency can be well tuned for the respective application. In this way, undesired ripple frequency can be substantially reduced or eliminated, while still retaining lower frequency components that are desirable to measure.

Using standard system dynamic analysis, an equation may be derived for the resonant frequency of the transducer assembly. The formula for the resonant frequency F may be expressed as:

$$F = \frac{\sqrt{(3\pi r^2 c^2 / 4LV)}}{2\pi},$$

where r is the internal radius of the inlet channel, c is the velocity of sound in the input stream pressure media, L is the length of the inlet channel, and V is the volume of the cavity. When an inlet passage and cavity structure is tuned to match the pressure ripple frequency, the ripple pressure can be amplified and can exceed the pressure rating of the transducer, the housing, and/or other parts of the assembly. For example, exceeding the rated pressure can apply excessive stresses on the transducer die and cause the transducer to fail.

Referring again to FIG. 2, and as may be appreciated by inspection of the resonant frequency equation above, the increase in the resonant frequency is roughly proportional to a corresponding increase in the radius r for inlet passages having a larger diameter D. However, as the inlet passage diameter D is decreased below about 1 mm (0.039") in diameter, capillary action can begin to take effect, reducing the corresponding change in resonant frequency, and resulting in diminishing returns of the reduction in the resonant frequency, and in some applications, making the inlet channel susceptible to clogging with the decreasing channel diameter D.

As may also be appreciated by inspection of the equation above, the resonant frequency F is also inversely proportional to the square root of the length L of the inlet passage and the volume V of the cavity. Therefore, the pressure ripple can be suppressed by increasing the inlet channel length L and/or increasing the volume V of the cavity.

In accordance with certain exemplary implementations of the disclosed technology, and as discussed above, the inlet channels may be configured to have diameters ranging from about 0.010" to about 0.100". In some implementations, the diameter of the inlet channels may range from 0.01" to 0.02". In some implementations, the diameter of the inlet channels may range from 0.02" to 0.04". In some implementations, the diameter of the inlet channels may range from 0.04" to 0.06". In some implementations, the diameter of the inlet channels may range from 0.06" to 0.08". In some implementations, the diameter of the inlet channels may range from 0.08" to 0.10". In some implementations, the diameter of the inlet channels may range from 0.10" to 0.20".

According to certain exemplary implementations of the disclosed technology, a differential pressure transducer assembly is provided that includes a header 202, a sensing element 201 mounted on the header 202, a front adapter 312 attached to a front portion 212 of the header 202, the front adapter 312 including a main channel 204 in communication with a first side of the sensing element 201, a back adapter 208 attached to a back portion 214 of the header 202, the back adapter 208 at least partially defining a reference channel 206 in communication with a second side of the sensing element 201, a front attachment port 207 including a reference channel 206 and a bore extending therethrough, the bore configured for mating with the reference port opening 205 of the front adapter 207, and a cap 209 attached to a back portion 220 of the back adapter 208, the cap 209 at least partially defining a reference cavity 222 in communication with the reference channel 206 of the front attachment port 207. According to certain exemplary implementations, the front adapter 312 is welded to the front portion 212 of the header 202; the back adapter 208 is welded to the back portion 220 of the header 202; a front portion 224 of the front adapter 312 is welded to a front portion 226 of the front attachment port 207, and the cap 209 is welded to the back portion 220 of the back adapter 208.

In certain exemplary implementations, the differential pressure transducer assembly may include a sleeve welded to a first mating portion of at least the front attachment port.

Certain example implementations of the differential pressure transducer assembly can include two or more header pins disposed perpendicular to an axis of the differential transducer assembly. In certain exemplary implementations, each two or more header pins may extend through a sidewall of the header and may be in electrical communication with the sensing element.

One skilled in the art will appreciate that narrowing the inlet ports and/or channels (i.e., decreasing the diameter) enhances attenuation. However, if it is too narrow for the applied pressure media, desirable low-frequency components (e.g., static and quasi-static pressures) may also be eliminated, which may interfere with the accuracy of the sensing element. Conversely, if the inlet ports and/or channels are too wide, high-frequency ripples may not be sufficiently eliminated, which can also interfere with the accuracy of the sensing element and can decrease its operable lifespan. It is clear that the similarity in the piping between the main port and the reference ports allows for better frequency matching between the ports. This can be important when both ports may experience similar rise times and it may be important to measure the response of both compared to each other.

As used in the specification and the appended claims, the singular forms "a," "an," and "the" include plural referents unless the context clearly dictates otherwise. Also, in describing the preferred embodiments, certain terminology has been utilized for the sake of clarity. It is intended that each term contemplates its broadest meaning as understood by those skilled in the art and includes all technical equivalents which operate in a similar manner to accomplish a similar purpose.

Ranges have been expressed herein as from "about" or "approximately" one particular value and/or to "about" or "approximately" another particular value. When such a range is expressed, an implementation includes values from the one particular value (starting point) and/or to the other particular value (ending point). In certain embodiments, the term "about" signifies a buffer of +/−5% of the said range about each said starting point and/or ending point.

As used herein, the terms "comprising" or "containing" or "including" mean that at least the named element or method step is present in the composition or article or method, but does not exclude the presence of other compounds, materials, particles, method steps, even if the other such compounds, material, particles, method steps have the same function as what is named.

Numerous characteristics and advantages have been outlined in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as outlined in the following claims. Therefore, other modifications or embodiments as may be suggested by the teachings herein are particularly reserved as they fall within the breadth and scope of the claims here appended.

We claim:

1. A differential pressure transducer assembly, comprising:
a header;
a front attachment port;
two or more header pins disposed perpendicular to a rotationally invariant axis of a front portion of the front attachment port of the differential pressure transducer assembly, each of the two or more header pins extending through a sidewall of the header and configured for electrical communication with a sensing element while being electrically isolated from the header;
a front adapter attached to a front portion of the header, the front adapter comprising a main channel configured to communicate with the front portion of the header;
a back adapter attached to a back portion of the header, the back adapter comprising a first portion of a reference channel in communication with a reference port opening in the front attachment port, wherein the front attachment port-comprises a second portion of the reference channel in communication with the first portion of the reference channel and in further communication with the port opening of the front attachment port, wherein the front attachment port is configured for mating with the front adapter; and
a cap attached to a back portion of the back adapter, the cap at least partially defining a reference cavity in communication with the first portion of the reference channel of the back adapter and the second portion of the reference channel of the front attachment port;
wherein:
the front adapter is welded to the front portion of the header;
the back adapter is welded to the back portion of the header;
a front portion of the front adapter is welded to the front portion of the front attachment port; and
the cap is welded to the back portion of the back adapter.

2. The differential pressure transducer assembly of claim 1, further comprising a sleeve welded to a first mating portion of the front attachment port.

3. The differential pressure transducer assembly of claim 1, further comprising a sensing element mounted on the front portion of the header.

4. The differential pressure transducer assembly of claim 3, wherein the main channel is in communication with a front portion of the sensing element.

5. The differential pressure transducer assembly of claim 1, wherein the reference cavity is at least partially defined by the back adapter.

6. The differential pressure transducer assembly of claim 1, further comprising a sensing element mounted on the front portion of the header, wherein the reference channel is in communication with a back side of the sensing element.

\* \* \* \* \*